(12) United States Patent
Frederick et al.

(10) Patent No.: US 7,350,705 B1
(45) Date of Patent: Apr. 1, 2008

(54) COMPACT ROBUST SMART CARD READER

(75) Inventors: William Bruce Frederick, Oceanside, CA (US); Curtis Terry Conant, San Pedro, CA (US)

(73) Assignee: International Technologies & Systems Corp., Cypress, CA (US)

( * ) Notice: Subject to any disclaimer, the term of this patent is extended or adjusted under 35 U.S.C. 154(b) by 77 days.

(21) Appl. No.: 11/092,784

(22) Filed: Mar. 28, 2005

(51) Int. Cl.
*G06K 7/06* (2006.01)
(52) U.S. Cl. .................. 235/441; 235/439; 235/475
(58) Field of Classification Search ................ 235/441, 235/492, 444, 483, 439, 475; 710/301; 361/737
See application file for complete search history.

(56) References Cited

U.S. PATENT DOCUMENTS

| | | | |
|---|---|---|---|
| 4,221,448 A | 9/1980 | Logerot et al. | |
| 4,735,578 A | 4/1988 | Reichardt et al. | |
| 4,909,742 A | 3/1990 | Ohkubo et al. | |
| 5,012,078 A | * 4/1991 | Pernet | 235/441 |
| 5,033,972 A | 7/1991 | Komatsu et al. | |
| 5,091,618 A | * 2/1992 | Takahashi | 235/441 |
| 5,231,274 A | * 7/1993 | Reynier et al. | 235/441 |
| 5,252,815 A | 10/1993 | Pernet | |
| 5,330,363 A | 7/1994 | Gardner et al. | |
| 5,334,034 A | 8/1994 | Reichardt et al. | |
| 5,380,997 A | * 1/1995 | Hania et al. | 235/485 |
| 5,463,210 A | 10/1995 | Imura | |
| 5,554,840 A | 9/1996 | Saroya | |
| 5,599,203 A | 2/1997 | Broschard, III | |
| 5,653,610 A | 8/1997 | Broschard, III | |
| 5,667,397 A | 9/1997 | Broschard, III et al. | |
| 5,686,714 A | * 11/1997 | Abe et al. | 235/435 |
| 5,729,000 A | * 3/1998 | Sugimoto | 235/441 |
| 5,796,085 A | 8/1998 | Bleier | |
| 5,936,222 A | 8/1999 | Korsunsky et al. | |
| 5,955,722 A | 9/1999 | Kurz et al. | |
| 6,053,776 A | 4/2000 | Bricaud et al. | |
| 6,186,402 B1 | 2/2001 | Johnson | |
| 6,216,955 B1 | 4/2001 | Le Roux et al. | |
| 6,283,376 B1 | 9/2001 | Schuder et al. | |
| 6,454,607 B2 | 9/2002 | Bricaud | |

(Continued)

*Primary Examiner*—Ahshik Kim (57) ABSTRACT

A compact long-life smart card reader consisting of a housing with a tapered card opening, a card receiving area, a plurality of contacts located above the card receiving area connected to an integral printed circuit board which is mounted in a carrier on a pivot characterized by an actuating tab on each arm of said pivot that, when contacted by a smart card's leading edge, causes the pivot element to move the contacts through apertures in the bottom housing into the card receiving area, making connection with the smart card's respective contact pads, after which the front edge of the card activates a card seated switch via a switch lever. The compact long-life smart card reader's housing contains either through holes, or threaded inserts that are used for mounting the reader to an enclosure, or terminal housing without the requirement of other compact smart card readers that require an external printed circuit board for electrical connection and mounting of the smart card readers' housing. A preferred embodiment includes the reader's "contacts" having a long cantilever design that provide a low, consistent contact force, resulting in minimum wear, long contact life, and positions the front row of the contacts to be as close to the card entry slot as possible, which allows for a smaller reader housing depth then found in any compact readers with similar life, integral printed circuit board, and mounting characteristics.

8 Claims, 7 Drawing Sheets

U.S. PATENT DOCUMENTS 6,655,590 B1  12/2003  McFeely et al.
6,672,514 B1   1/2004  Brennan et al.
6,736,318 B2   5/2004  Reichardt et al.
6,802,448 B2  10/2004  Bricaud et al.

* cited by examiner

COMPACT ROBUST SMART CARD READER

CROSS REFERENCE TO RELATED APPLICATIONS

Not Applicable

FEDERALLY SPONSORED RESEARCH OR DEVELOPMENT

Not Applicable

DESCRIPTION OF ATTACHED APPENDIX

Not Applicable

BACKGROUND

1. Field of Invention

This invention relates to electrical connectors known as a smart card readers, into which smart cards are inserted to a reading position where contact elements provided in the smart card reader engage contact pads on the smart card to provide temporary electrical connection to allow for both reading and writing data to and from the smart card.

2. Discussion of Prior Art

This invention relates generally to the field of electronic cards more commonly known as Integrated Circuit Cards (ICC), smart cards, or chip cards, and to the apparatus known as a smart card reader which provides temporary electrical connection with the smart card's microprocessor/memory contacts (pads) on the surface of the card. More specifically, this invention relates to a compact (small) smart card reader into which smart cards are repeatedly inserted, temporarily engaging the card's contact pads with contacts in the smart card reader when the card is fully inserted to a card-reading position as indicated by a switch.

Smart cards, or chip cards are the same size as credit cards (ref: ISO7816 & ISO7810 standards), and used for applications requiring data transfer in either secure or non-secure environments. They are most commonly used for credit/debit transactions in the retail industry, but additional applications for smart cards are gaining in popularity these include: personal identification, computer system access control, so called 'closed systems' for payments/identification, medical records storage cards, etc. All smart cards contain a set of gold-plated metallic contact pads located on the surface of the card (according to ISO7816 standards), which are internally connected to either a microprocessor, or memory chip. The smart cards are inserted into smart card readers which make electrical connection to the pads on the smart card through contacts mounted within the smart card reader. After electrical contact is made, communication with the card can be established so that data can be bi-directionally transferred between the card and a host processor using the smart card reader as an electrical conduit.

As smart cards become more prevalent, new applications are becoming popular, such as small countertop point-of-sale (POS) terminals, handheld POS terminals, portable data acceptors (PDAs), personal identification number (PIN) verification terminals, etc. These devices require a smart card reader which is compact, robust, (i.e. designed for over a million card cycles), and can be easily mounted into a housing without requiring a host printed circuit board for support. In all point-of-sale applications, banking associations Visa and Mastercard now require that all smart card readers be tested by accredited laboratories to ensure they are in compliance with Europay/MasterCard/Visa (EMV) standards. Smart card readers that are proved to be in compliance are granted EMV certification. Because of that requirement, the terminal industry needs a compact smart card reader that is EMV certified, which additionally allows them the flexibility of designing their terminal without requiring them to get the smart card reader certified. Compact smart card readers currently on the market must be mounted on an external printed circuit assembly (PCA). In addition the PCA is necessary to provide electrical connection to their contacts. That means the terminal manufacturer must design a PCA that mechanically supports the compact smart card reader, provides electrical connections from the reader, routes signals to its host processor, and then submit that PCA/Reader for certification. A compact reader that has an integral PCA would eliminate this requirement for certifying the reader every time the PCA design is changed for a new terminal application There are currently two types of smart card reader connectors: a "sliding" type, and a "landing" type. One example of a compact sliding-type reader is disclosed in U.S. Pat. No. 6,655,590 Dec. 2, 2003 by McFeely, et al, which discloses a reader where a smart card is inserted into the reader, and consequently slides over the connector contacts until it is fully inserted. The smart card reader's contacts are spring-loaded, exerting a normal force onto the smart card's surface, starting at the front edge of the card until the fully-inserted position, on both insertion and withdrawal of the card. Upon full insertion, the smart card reader's contacts align with the smart card's contact pads.

This type of contact presents a problem in that the reader's contacts sustain continuous wear from riding on the surface of the card throughout the insertion and withdrawal process. That action generates debris, which is picked up by the reader's contacts, and may contain material that serves as a dielectric, making it more difficult to obtain a reliable electrical connection. Another problem is created in that the wiping action of the contacts will mar any graphics within their path on the card, and will cause wear of the reader's contacts, severely limiting their operating life. This type of contact is typically used in applications that require only a limited number of card insertions/withdrawals and are not subject to abuse or debris, such as a home PC access reader or television set top box smart card reader. This reader is installed by soldering its smart card contact legs to an external printed circuit board that is part the host terminal.

An example of the landing type of smart card reader is disclosed in U.S. Pat. No. 5,936,222 Aug. 10, 1999 by Korsunsky, et al, where the contacts are designed with each having a leg passing through a base (reader frame) for electrical connection with a printed circuit assembly. An arm extending from the leg is substantially perpendicular to the leg, and pivotal in relation thereto. A contact point is disposed on the arm at a first end towards the mating surface and an actuating section is disposed on the second end opposite the mating face. Upon insertion of a card into the smart card reader, the contact point will not engage the major surface of the card until the card engages the actuating section, causing the arm to pivot about the leg to exert a normal force on the contact points of the card sufficient to establish electrical connection. This type of contact presents a problem in that the actuating portion of each contact must exert a normal force to the card's surface until the card is fully seated. That force is concentrated in a small surface area which creates considerable wear and debris which will substantially reduce the active life of a card, since the actuating portion of the card will wear from repeated insertions. Moreover, the reader does not have any openings for the debris to exit the reader. That debris can therefore be picked up by the contacts, which can result in an unreliable electrical connection between the card's pad and the smart card reader's contacts. Another limitation of this 'pivot' design is the limited pivot action provided by the relatively short lever arm on the contact, restricting the contact area of the pivot from maintaining a consistent force on bowed, or worn smart cards. This design requires an external printed circuit board to obtain electrical connection to the contacts, and physically mount the smart card reader One common condition for prior-technology compact smart card readers, is that their design required that they be secured (soldered) to a printed circuit board to provide both mechanical support for the smart card reader's chassis, and electrical connection with the reader's contacts. The end user was therefore required to design a printed circuit board that mated with the compact smart card reader, and also positioned the reader appropriately in the enclosure.

Another example of a prior technology compact smart card reader is disclosed in U.S. Pat. No. 5,252,815 Oct. 12, 1993 by Pernet, which shows a smart card reader with sliding type contacts, soldered to a PCA which in turn is soldered/riveted to a case (housing). The invention's stated objective is to create a smart card reader " . . . of reduced overall dimensions and cost . . . ". The invention described in said patent results in a reader that is not very compact, or robust which has sliding contacts, and has a chassis that cannot be easily integrated (mounted) inside a terminal housing. This prior technology for a compact smart card reader does not provide for applications that require over one million cycles due to the sliding type of contact design which creates substantial contact wear. Prior technology for compact smart card readers does not provide for an internal printed circuit board, which requires the end user to design a printed circuit board for providing electrical connection with the reader's contacts, and card seated switch.

The one consistent feature that existing compact smart card readers have is that they cannot be secured to a housing without additional mounting brackets and/or printed circuit boards. That ability is only available in substantially larger, and mechanically more complex, smart card reader designs such as the one disclosed in U.S. Pat. No. 5,554,840 Sep. 10, 1996 by Saroya. That reader provides a landing contact and integral printed circuit board, but is substantially more complex, expensive, larger, and is not suitable for mounting in a handheld, or small countertop terminal.

Among the design problems facing handheld product manufacturers is the limited depth of the handheld terminal. That lack of depth, results in most handheld readers being designed with the smart card insertion slot located on the front or back surfaces of the terminal, rather then the top surface where it is easily seen and more accessible to the user. The main reason for that, is that the design of prior-technology smart card reader contacts does not allow for a smart card to be inserted to a minimum depth. Therefore, those readers require a deeper (longer) reader housing which cannot be positioned on the top surface of most handheld terminals.

Objects and Advantages

Accordingly, several objects and advantages of the invention are an extremely compact robust smart card reader with an integral printed circuit assembly and landing style contacts that provide reliable electrical contact over an operational life of over one million card insertions and withdrawals. The invention provides an integral printed circuit board assembly that requires no external mounting provisions, which are not available in prior compact smart card readers. The integrated printed circuit assembly (PCA) eliminates the requirement for a separate printed circuit board for supporting the smart card reader's housing and contacts, thus freeing terminal manufacturers from the task of designing a PCA. The advantage of this invention is made even more significant with the worldwide requirement from Visa and Mastercard credit card associations, that all smart card readers used in terminals for point-of-sale transactions, must have Europay/Mastercard/Visa (EMV) certification. Because the compact robust smart card reader has EMV certification, the terminal manufacturer does not have to go through the time an expense of designing the PCA, and getting it EMV certified.

The landing contacts are designed as long cantilever springs, which ensures that each card reader contact will exert a constant, controlled contact force on the smart card's contact surface. That design provides for long reliable contact life, unlike prior compact smart card readers that have sliding contacts and/or contact designs that exert greater forces on the reader/card's contact surfaces. This invention achieves the landing action of the contacts by means of a simple pivoting of the PCA holder, and PCA, which produces a constant force, and controlled sliding action of the contacts.

The design of the cantilever contacts positions them in the compact robust smart card reader so that the smart card need only be inserted to a depth only slightly more then required for the minimum dimension allowed for the smart card's contact pads. This allows the depth of the compact robust smart card reader's housing to be shorter then prior-technology compact readers, which have contacts positioned so that they require significantly more of the smart card to be inserted, resulting in a larger insert reader body.

A further object of the invention is to provide a compact smart card reader that can be easily mounted to an enclosure via threaded inserts and/or through holes located within the reader's housings (so that the enclosure/terminal only needs to accommodate mounting screws). This is unlike prior-technologies that require external PCAs, mounting brackets for their external PCAs, and/or housings specifically designed to support a PCA with smart card reader housing.

Yet another object of the invention is to provide a robust compact smart card reader that contains EMV-certified contacts and electronics with all required interface signals for either direct connection to the smart card contacts or RS232 communication via a flex cable or equivalent electrical conductors. This invention provides a smart card reader that conforms to EMV-required certifications in a small self-contained package to be built into a host device. This is unlike prior-technology compact smart card readers that require an external PCA that must be EMV certified each time the reader is used in a different terminal or each time the external PCA is redesigned for use in other terminals.

An important requirement of all smart card readers is that they secure the smart card in a fully seated position while the transaction is taking place. The compact robust smart card reader firmly secures the smart card by clamping it in place on each side when it is in the fully seated position. Other smart card readers use a separate clamp which can mar the surface of the card, and doesn't provide as positive a holding force.

Further objects and advantages of this invention will become apparent from the following descriptions, taken in connection with the accompanying drawings.

SUMMARY OF THE INVENTION

The object of this invention is to provide an extremely compact, reliable, long wear, self-contained smart card reader that can be easily mounted within a countertop terminal, handheld terminal, or other type of enclosure. The object has been achieved by using a plurality of landing contacts that provide over a million smart card insertion/withdrawal cycles, that are mounted in a compact housing, of minimum size, and that contain a printed circuit assembly. The compact robust smart card reader's housing has either threaded brass inserts, or through-holes so that it can be easily mounted inside a terminal or enclosure without an external PCA or special brackets.

DRAWINGS OF SMART CARD READER AND COMPONENTS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DRAWINGS

Reference Numerals

| | |
|---|---|
| 01 compact robust smart card reader | 10 top housing |
| 11 printed circuit assembly holder | 12 printed circuit assembly |
| 13 smart card reader contacts | 14 pivot |
| 15 pivot Pins, top housing | 16 pivot pins, pca holder |
| 17 bottom housing | 18 switch lever |
| 19 card insertion opening | 20 lead in angles |
| 21 card receiving area | 22 contact tip |
| 23 bottom housing locking snaps | 24 pivot pin grooves, pca holder |
| 25 top housing pivot pin grooves | 27 pivot actuator ramp |
| 28 smart card | 29 contact apertures, bottom housing |
| 31 top housing snap tabs | 33 torsion spring |
| 35 debris opening | 37 flex cable |
| 39 card seated switch mount | 40 switch lever tip |
| 41 card seated switch | 42 switch actuator button |
| 44 card stops | 46 switch Lever Pivot |
| 47 card securing tab | 48 threaded Inserts |
| 49 through holes (optional not shown) | 50 locking slot, bottom housing |
| 52 locking tab, top housing | 54 contact molded plastic base |
| 56 contact stops | 62 typical contact area |
| 64 minimum contact pad size, smart card | 66 smart card leading edge |
| 67 top housing alignment tabs | 68 bottom housing reliefs |
| 70 contact landing surface | 72 lever pivot socket |
| 74 interference fit | 76 contact positioning tabs |
| 78 contact locking tab | 80 contact solder pin |
| 82 molded contact assembly | 86 smart card side |

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. Each of the major components will be discussed, and their operation described in greater detail in the following descriptions.

Figure 1:
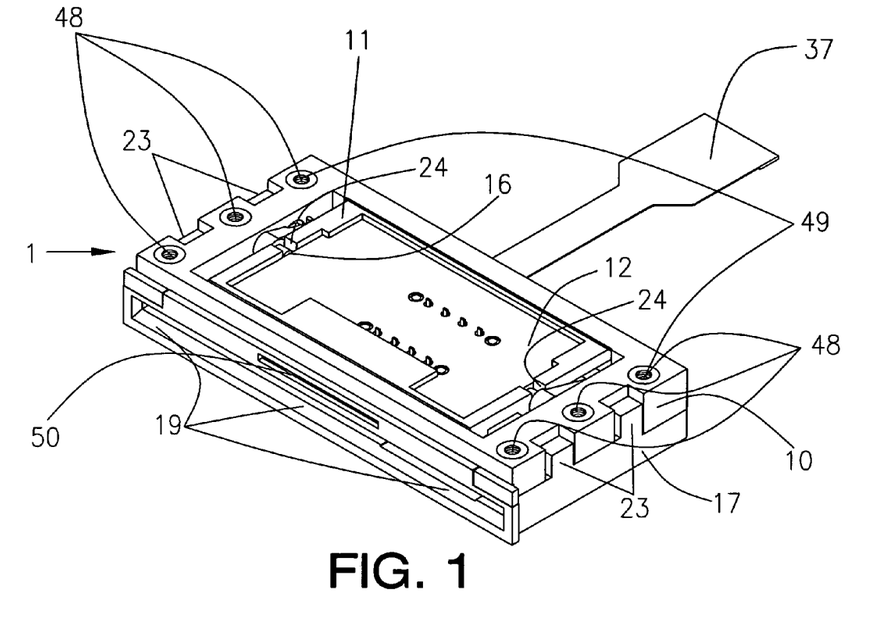
FIG. 1 is an isometric view of the assembled smart card reader showing the placement of the PCA, mounting inserts, flex cable, and card entry slot.
Figure 1A:
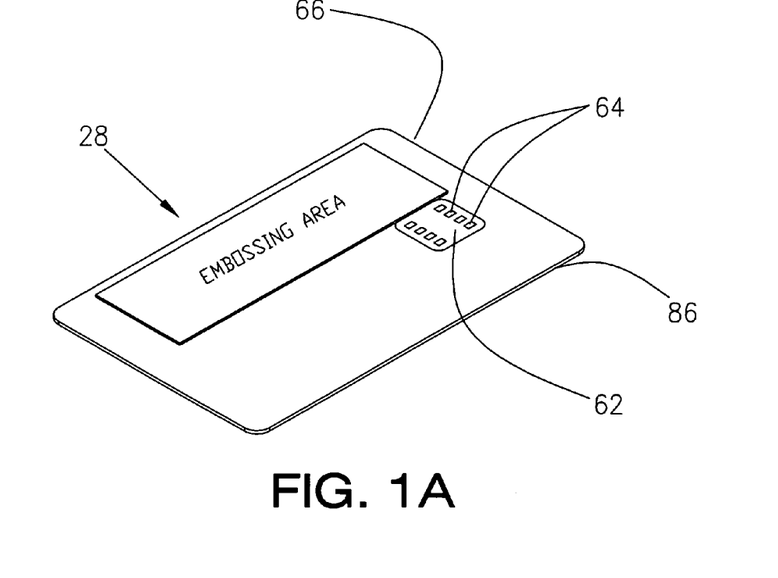
FIG. 1A is an isometric view of a ISO standard smart card showing the minimum area for the contact pads, and their position on the smart card

Description FIG. 1A

The compact robust smart card reader 1, shown in FIG. 1 is designed to accept smart cards conforming to International Standards Organization's (ISO) 7810 & 7816 standards. FIG. 1A shows an isometric drawing of a smart card 28, that conforms to ISO 7810 & 7816 standards, with the typical contact area 62 and location. The contact area 62 is approximately 13 mm by 12.2 mm wide and begins 8.6 mm from the leading edge 66, and 17.5 mm from the smart card's side 86. Most smart cards have contact pads that occupy the area indicated, but the ISO7816 standard specifies a minimum area that must be met, it is that size that the compact robust smart card reader 1 has been designed to read. The Minimum area 64 is 2.00 mm by 1.70 mm, and is the same for all eight contact pads, as shown in FIG. 1A.

Description FIG. 1

The invention will first be described generally with reference to FIG. 1. FIG. 1 is an isometric view of the compact robust smart card reader assembly 1, it is comprised of a top housing 10 and bottom housing 17, which are held together by four locking snaps 23, and bottom housing locking slot 50. The smart card reader's 1 top and bottom housings 10 & 17 are glued together after functional testing has been completed. Card insertion opening 19 is located in bottom housing 17, and provides access for the smart card 28 see FIG. 1A to enter the reader. The reader 1 can be mounted via brass threaded inserts 48, or optionally mounted when brass inserts are not used, with the two through holes 49. A flex cable 37 provides electronic interconnection between the host, and PCA 12. The flex cable 37 is used for both direct connect versions of the reader which has no integrated circuits on the printed circuit assembly (PCA) 12, or intelligent versions of the PCA 12 that contain a microprocessor with full RS232, or USB communications. In the direct connect version the cable provides electrical connection to the card seated switch 41 and contacts 13 shown in FIG. 2. When PCA 12 has USB, RS232, or other forms of interface electronics, which can be EuropayMasterCardVisa (EMV) certified, it provides electrical connection and communication through flex cable 37. The printed circuit assembly holder 11 is held by, and pivots about pca holder pivot pins 16, which are positioned in pca holder's pivot pin grooves 24.

Figure 2:
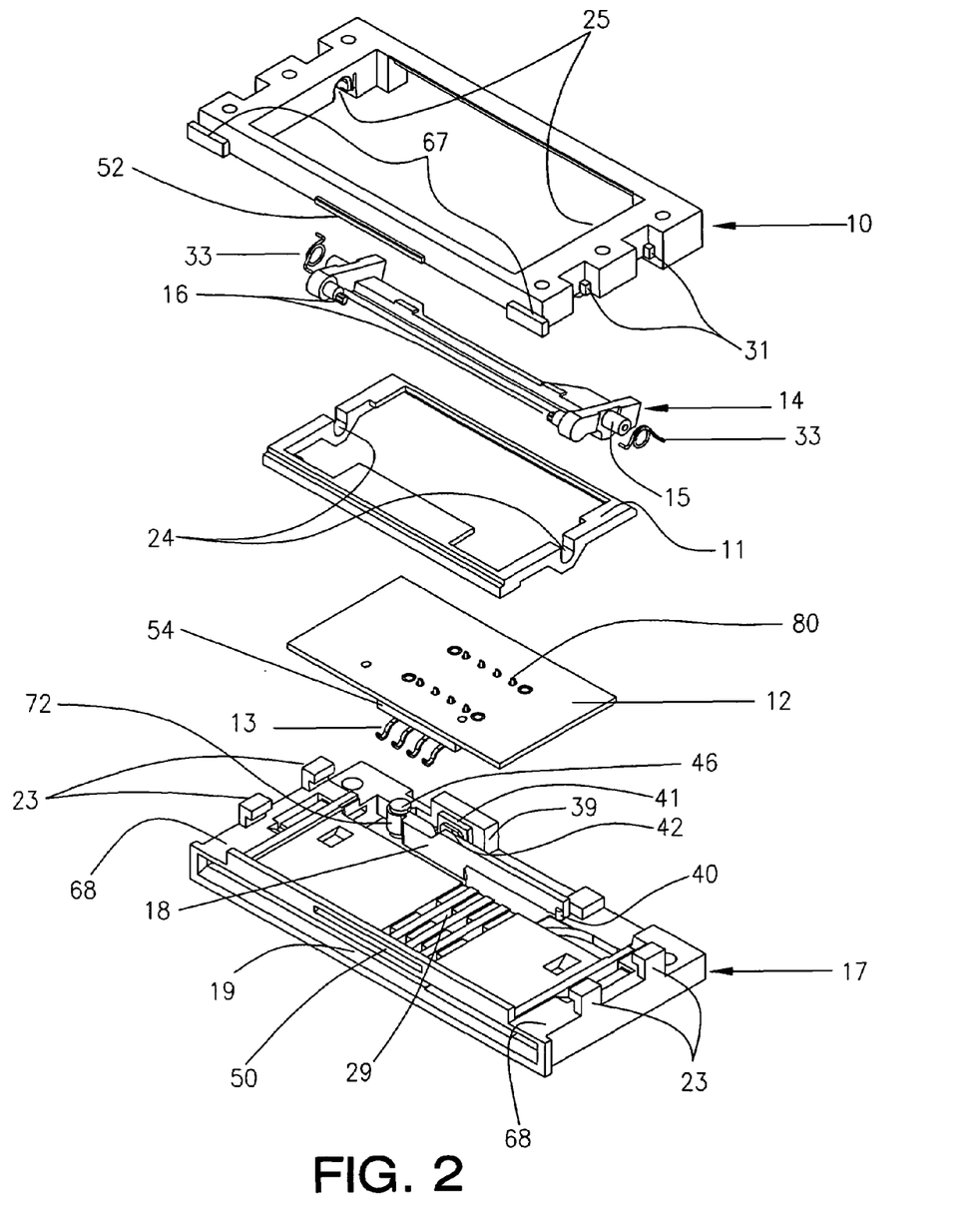
FIG. 2 is an exploded view of the smart card reader revealing the major components of the reader which are the top/bottom covers, pivot arm, PCA holder, PCA, and card seated switch/lever.

Description FIG. 2

Each major component's assembly relationship will now be described in greater detail with reference to FIG. 2 which is an exploded view of the compact robust smart card reader 1, showing its major components. When other Figs. are required to clarify a component, and/or functioning of components, the respective Fig. number will be referenced for clarity. The reader is comprised of a bottom housing 17 which contains the card insertion opening 19, and locking tabs 23 for securing the top housing 10 to the bottom housing 17. The bottom housing 17 is molded from a wear resistant glass & PTFE filled plastic (ABS or equivalent plastic) ensuring that there will be minimum amount of wear throughout smart card reader's 1 long life. The bottom housing 17 has eight contact apertures 29 which, when assembled, provide openings for the contacts 13 to align with and protrude into when in the non-active position (a smart card is not fully seated in the card receiving area 21—FIG. 4). The card seated switch lever 18 is molded with a cylindrical pivot pin 46, which when installed in the bottom housing's 17 lever pivot socket 72, provides a low friction, pivot bearing area for switch lever 18. The switch lever 18 is molded from a high strength wear resistant plastic (30% glass filled polycarbonate, or equivalent) that has excellent frictional characteristics when its pivot pin 46 is rotating in the molded pivot socket 72 in the bottom housing 17. The switch lever 18 is mounted in front of card seated switch 41, which is soldered to a switch flex cable (not shown for clarity), and secured on mounting bracket 39 by two plastic molded pins on the bracket 39. The card seated switch 41 is an enclosed design to eliminate the entry of contamination with a life exceeding 1 million cycles when used as designed in the compact robust smart card reader 1. A switch actuator button 42 is positioned in the center of the card seated switch's body 41, and is pressed toward the switch body 41 by a switch lever 18 when it is contacted by the smart card's leading edge 66.

Description of FIG. 2

Referring to FIG. 2 the PCA 12 is mounted in PCA holder 11 which is molded from a wear resistant glass & PTFE filled plastic (ABS or equivalent plastic) which is held in place by, and free to pivot about PCA holder pivot pins 16. When assembled the top housing 10 is mounted to bottom housing 17, and captures the top housing pivot pins 15 in the top housing's 10 pivot slots 25, and torsion springs 33. The springs 33 are made from 302 stainless spring steel (or equivalent), with their loose ends captured under the pivot 14, and top housing 10. They are used to return the pivot 14, and PCA holder 11 to the inactive position when a smart card 28 is not in the fully seated position. Pivot 14 is molded from a high wear, lubricious plastic (polycarbonate 30% glass, 15% PTFE or equivalent) that provides a low friction mating surface with the top housing's pivot pin grooves 25, and PCA holders' pivot pin grooves 24. When assembled, bottom housing locking snaps 23 secure the top housing 10 in place with the top housing snap tabs 31, and locking tab 52 mates with the bottom housing's locking slot 50. Precise positioning of the two housing is provided when the top housing's alignment tabs 67, mate with bottom housing reliefs 68. The torsion springs 33 are mounted on pivot pins 15 and secured when the top and bottom housings are assembled.

Description of FIGS. 3 through 6

Figure 3:
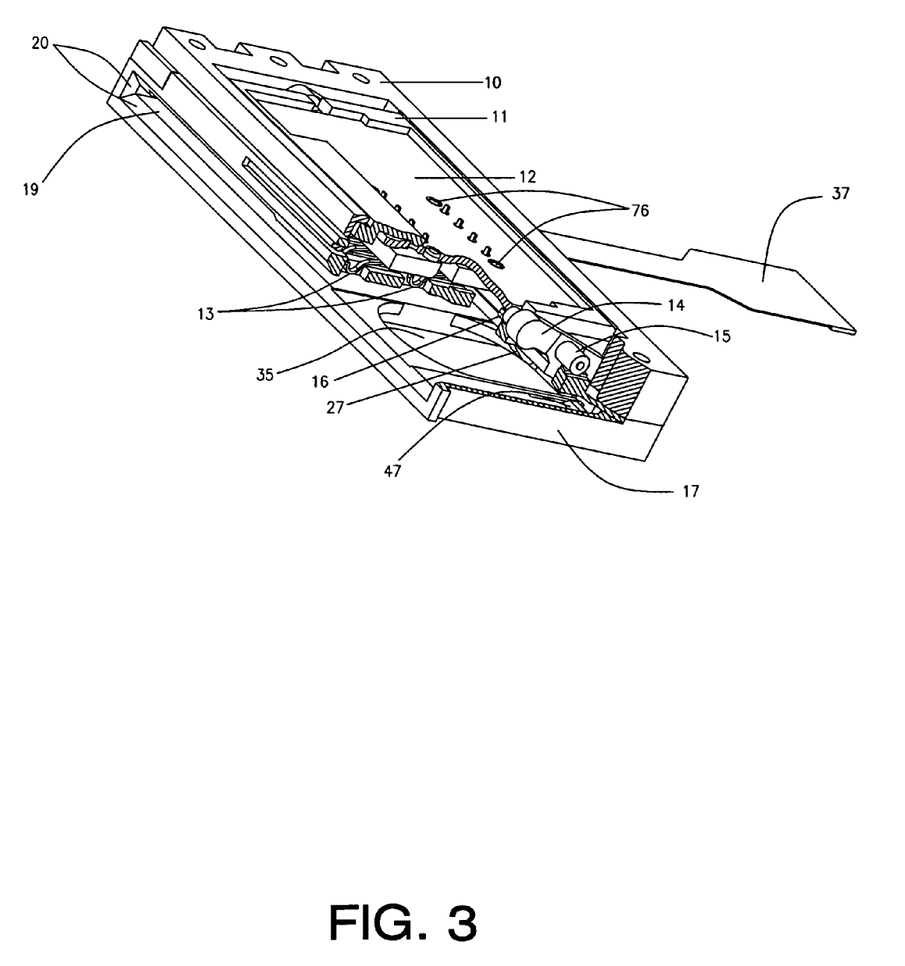
FIG. 3 is an assembly view of the smart card reader showing the top and bottom housings with a section removed to reveal the assembled relationship of the pivot, PCA holder, top housing and contacts.
Figure 4:
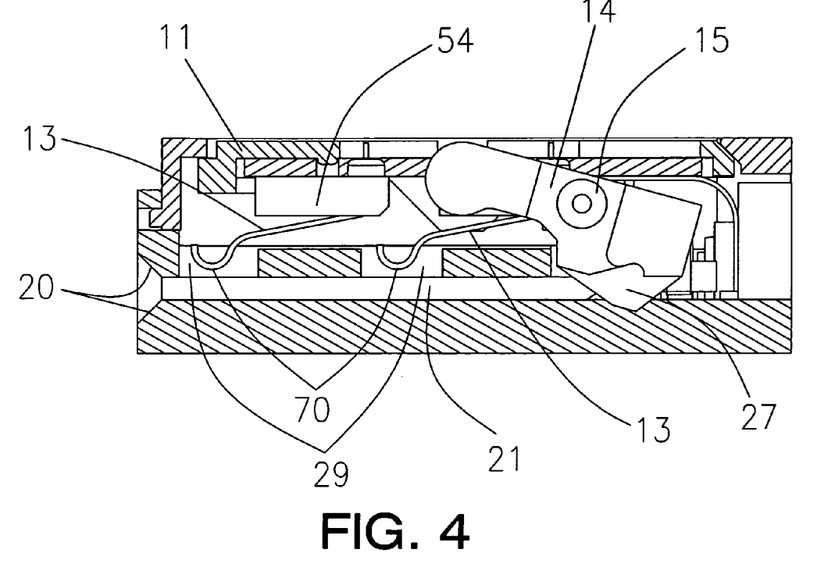
FIG. 4 is a cross section view of the smart card reader showing the card receiving area, relative position of the contacts, and pivot ramp when in the inactive position.
Figure 5:
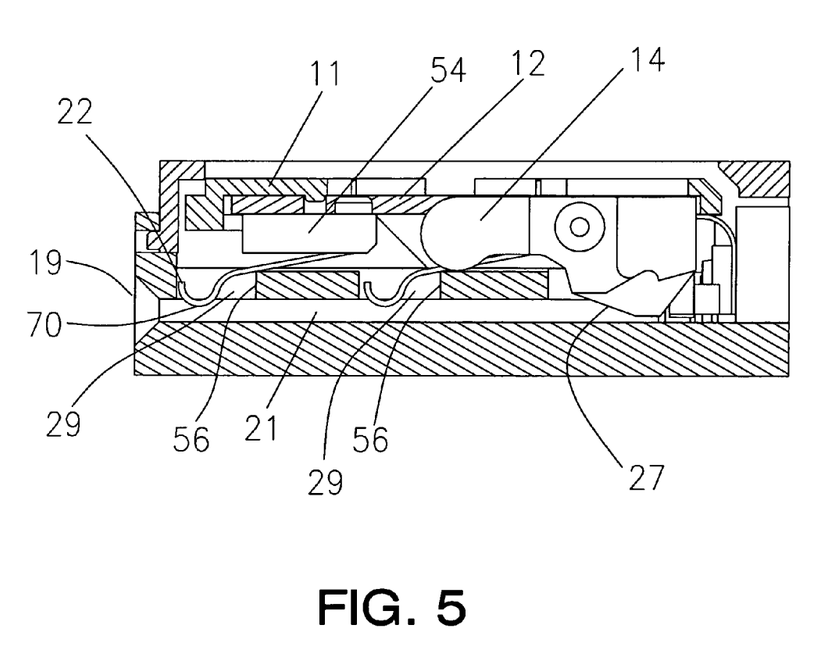
FIG. 5 is a cross section view as in FIG. 4, except the contacts, PCA holder, PCA and pivot are in their active position.
Figure 6:
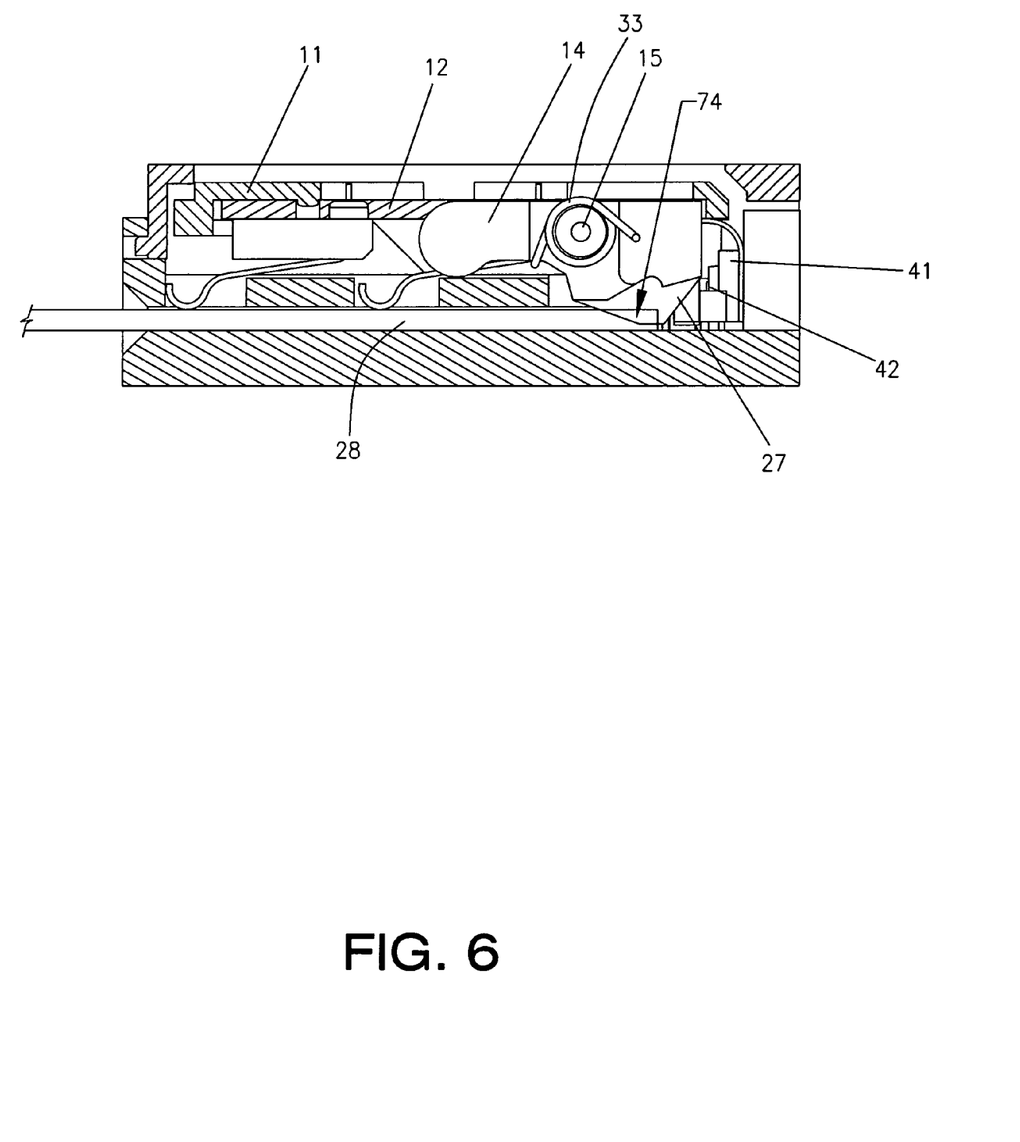
FIG. 6 is a cross section view as in FIGS. 4 & 5, except it shows the contacts in contact with a smart card and the interference the smart card has with the pivot actuator ramp.

FIG. 3 is an assembly drawing of the compact robust smart card reader with a cut away section showing the bottom housing 17 with debris openings 35 that allows foreign matter/debris a means to exit. Also shown is a card securing tab 47 which applies perpendicular force to a fully inserted smart card 28 to assist in securing it in the reader 1. The card entry opening's lead in angles 20 serve to guide smart cards' leading edge into the card insertion opening 19. FIG. 3 shows how PCA holder 11 secures the PCA 12 and is precisely held in position by the PCA holder pivot pins 16 when assembled into the compact robust smart card reader 1. FIG. 4 is a sectioned view of the reader 1 which shows two contacts 13 positioned in the bottom housing's contact apertures 29 in their non-active position so that the contact landing surface 70 is not protruding into the card receiving area 21 which protects them from intentional (vandalism), or unintentional damage when a smart card is not inserted. The pivot actuator ramp 27 is shown in an inactive position. FIG. 5 shows the contact landing surfaces 70 protruding into the receiving area 21 their maximum amount of approximately 0.3 mm. The contact's tips 22 are prevented from protruding into the receiving area 21 by the upper rear edges 56 of the contact apertures 29 see FIG. 2. The front contact's landing surface 70 is located approximately 2.5 mm from the front surface of the reader 1. FIG. 6 is a sectioned view of the smart card reader 1, that has a fully inserted smart card 28, and the designed interference, shown as area 74, with the pivot actuator ramp 27. That interference serves to secure the smart card 28 in the reader 1, and produces the required force on the pivot to rotate the contacts 13, pca 12, and pca holder 11 toward the card 28.

Figure 7:
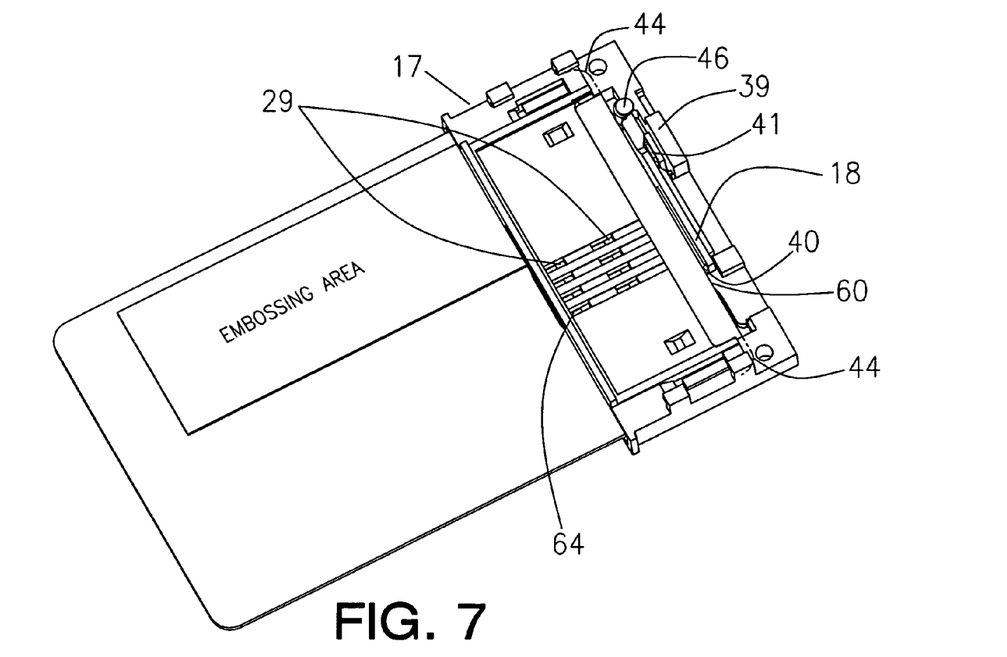
FIG. 7 is a view of the bottom housing with a smart card fully inserted, and showing the positions of the minimum smart card contact pad's area within the bottom housing's contact apertures, and the card seated switch lever in its active position.

Description FIG. 7

FIG. 7 is a view of the reader 1 with the top housing 10 removed, revealing the bottom housing 17 with a smart card 28 fully inserted so that it is in contact with the switch lever 18, activating card seated switch 41. The contact appertures 29 are shown with the minimum smart card contact area 64 defined. The card 28 is inserted until it contacts the card stops 44, shown as hidden lines in the bottom housing 17. The lever 18 pivots about the switch lever pivot 46.

Figure 8:
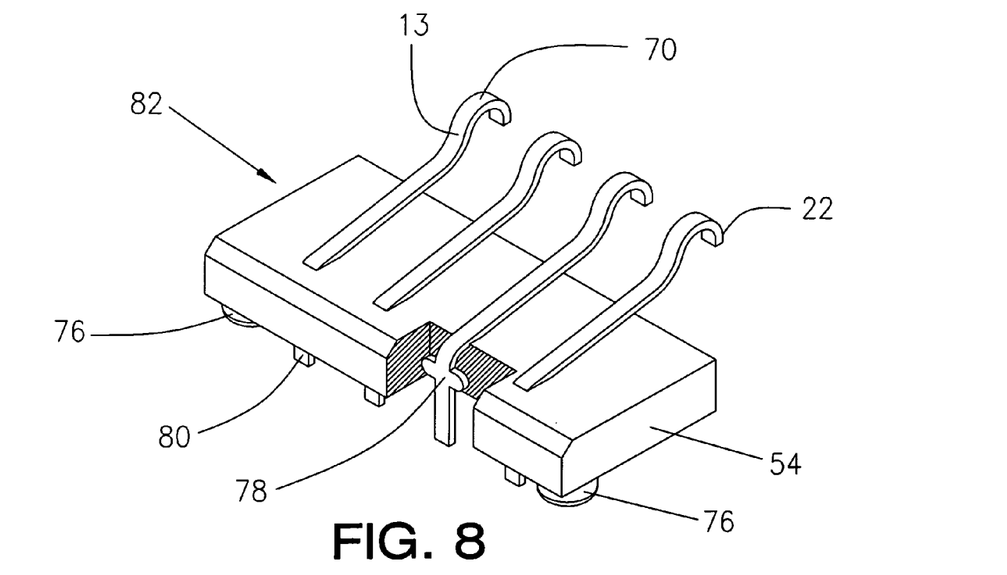
FIG. 8 is an isometric view of the molded contact assembly showing the four contacts, with contact solder pins and contact positioning tabs.

Description FIG. 8

The reader 1 has 8 individual contacts 13, which consist of two sets of four contacts 13, that are molded into a contact base 54 making the contact assembly 82. A plurality of contacts 13 (each contact is made from gold/nickel plated ¾ hard berylium copper stampings, or equivalent materials) that are molded into, and extending through plastic base 54. FIG. 8 shows that the active end of the contacts 13 are utilized as a cantilever type spring which, when activated, provides a constant contact force at the contact landing surface 70 on contact pads 64 in FIG. 1A. The opposite ends, contact locking tabs 78, and contact legs 80 are molded in a plastic base 54 (ABS plastic or equivalent) that provides support for the cantilever spring portion of the contact 13. The base 54 has two positioning tabs 76 which precisely locate the contact assembly 82 on the PCA 12. Additionally the contact legs 80 extend through molded base 54, into holes in PCA 12, which are soldered to provide good electrical connection with the PCA 12.

Figure 9:
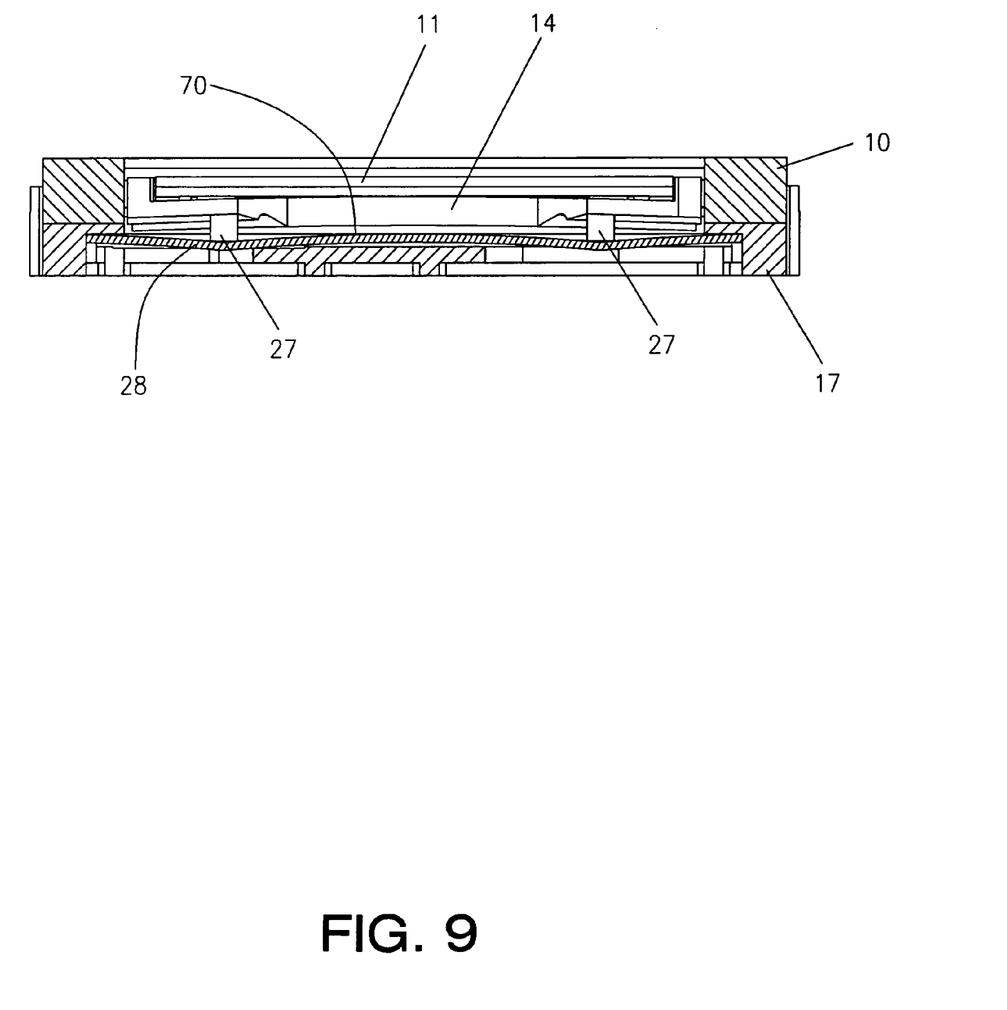
FIG. 9 is a cross section view of the pivot actuator ramps in their active position with a smart card in the fully insert position.

Description of FIG. 9

FIG. 9 is a sectioned view showing the pivot actuator ramps 27 in contact with smart card 28, when the smart card 28 is fully inserted. The ramps 27 exert a perpendicular force on the card 28, which causes the card 28 to bow downward directly below each ramp 27 and subsequently the card 28 bows up toward the printed circuit assembly 11 toward its center. That bowing action causes the card's 28 contact pads 64 to move toward the contacts landing surface 70 which helps to ensure that even a thin card will be in close proximity to the contacts' surface 70 allowing for the same force on thin cards as well as standard thicknesses.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

Advantages

From the descriptions above a number of advantages of the compact robust smart card reader 1 become evident. The readers 1 compact size allow it to be used in applications that require a long life reader, but do not have adequate space for the prior-technology readers that have the features found in the compact robust smart card reader 1. The landing contact design provides a long wear contact 13, that is packaged in a compact housing which, when assembled (refer to FIG. 1) measures less then 58 mm wide, by 27 mm deep by 9 mm high. It has an integral PCA 12 which allows it to be mounted to a housing, or enclosure using either through holes 49, or threaded inserts 48, without requiring a separate printed circuit board for support or electrical connection. The pivot actuator ramps 27 provide a positive locking mechanism to keep the smart card 28 in the reader during reading/writing operations, by providing a perpendicular force directly on the smart card 28 in two places at the rear of the smart card reader 1. The long cantilever contact 13 design provides for a contact 29 life in excess of one million cycles, due to the landing style contacts 13, and distribution of force on the landing surface 70 while in contact with the smart card contact pads 64.

Operation—FIGS. 1-FIGS. 9

The operation will be described in detail in the following section, and will reference FIGS. 1 though 9 as required to clarify the description. The compact robust smart card reader 1 provides temporary electrical connection to a smart card's contact pads 64 which allows it to perform read and write operations as required by the application. Those applications can be EMV point of sale transactions, or closed system types of applications.

Referring to FIGS. 1, 1A, 3, and 7 the typical operation of the smart card reader 1 begins when a smart card 28 is inserted into the card insertion opening 19 with the smart card's contact pads 64 facing the PCA 12. The smart card 28 is guided into the card insertion slot 19 by lead in angles 20, and continues into the card receiving area 21 unimpeded, until the smart card's leading edge 66 makes contact with the pivot actuator ramps 27, and the switch lever's tip 40. The smart card leading edge 66 contacts the actuator ramps 27 which forces the pivot 14, to rotate counterclockwise about pivot pins 15 in pivot pin grooves 25 in the top housing 10. That rotation causes the PCA holder pivot pins 16 to move the PCA holder 11 toward card receiving area 21, which in turn forces the plurality of contacts 13 through the contact apertures 29, into the card receiving area 21, landing the contact's surface 70 onto the inserted smart card contacts' 64, which establishes electrical connectivity of less then one half ohm to each contact. As the smart card's leading edge 66 continues into reader, it contacts switch lever tip 40, which causes switch lever 18 to rotate about pivot 46. Switch lever 18 in turn activates the card seated switch's actuator button 42 which results in a change in the electrical signal from the card seated switch 41. That card seated signal indicates that the smart card has reached the fully seated position. It is important to note that electrical connectivity between the contacts 13, and smart card's contacts 64 is established prior to the switch lever 18 activating the card seated switch 41. This sequence of events is critical because the card seated switch 41 signals the electronics that it is safe to apply power to smart cards' 28 imbedded chip. That sequence of events is accomplished in this invention by the design of the switch lever, and pivot actuator ramp, and does not require any adjustment during manufacturing.

The pivot's 14 operation will be described in greater detail with reference to FIGS. 4, 6 and 9. The pivot 14 is molded from a high strength lubricous plastic which has minimum wear throughout its life, the actuator ramps 27 have a wide contact area which distributes the load on the card and ramp for minimum wear. FIG. 6 shows that the pivot actuator ramps 27 are designed with an interference fit 74 with the smart card 28 which accomplishes two objectives: A. the smart card's initial contact with the pivot actuator ramp 27 causes the ramp to move up, which in turn forces the pivot 14 to rotate about pivot pin 15, this motion continues until the card is fully seated; B. The interference fit 74 provides the rotational force required to move the PCA holder 11, PCA 12, and contacts 13 onto the smart card contact pads 64, and also secures the smart card in its fully seated position. FIG. 9 shows that the smart card 28 bows upward toward PCA 12. in the area of the contact landing surfaces 70. That action ensures that varying thickness of smart cards 28 will always have a constant force applied by contact surfaces 70. Securing a smart card in the card seated position is important, since removing a smart card during a read/write operation can invalidate the transaction.

As the smart card is removed, its leading edge moves away from the pivot actuator ramps, which causes the switch lever 18 to deactivate the card seated switch 41, and upon further withdrawal of the smart card 28, the pivot 14 continues to rotate about pivot pins 15, moving the contacts 13 off of the smart card's contact pads 64, That sequence of events takes place each time a smart card is withdrawn from the compact robust smart card reader 1.

A detailed description of the card seated switch 41 design and operation will be described in reference to FIGS. 2 & 7. The sequence begins upon contact of the smart card's leading edge 66 with the switch lever's tip 40, the switch lever 18 begins to pivot about the switch lever's pivot 46, which is mounted in the bottom housing's pivot socket 72. As the smart card's leading edge 66 moves further into the reader, the switch lever begins to depress the card seated switch's actuator button 42. Because the card seated switch's actuator button 42 is located in close proximity to the switch lever's pivot 46, the force required to actuate the card seated switch 40 is greatly reduced (by approximately 70%) due to the leverage gained by use of the switch lever. That leverage means that the operator inserting a smart card does not feel any significant resistance as it's leading edge 66 comes in contact with the switch lever 18, and continues to activate the card seated switch 41. The smart card 28 becomes fully seated when it contacts the card stops 44 which are molded into the bottom housing 17, the card seated switch is activated, and the switch lever is in its closed most position. The design of the card stops 44 (refer FIG. 7) prevent the smart card's leading edge 66 from exerting any additional force on the switch lever 18, and card seated switch's actuator button 42, thus eliminating the ability of the card to exert excessive force on the switch lever 18, or card seated switch 41. The switch lever 18 is molded from a high strength plastic, and designed so that no adjustment is required to actuate the card seated switch 41 after the contacts 13 have electrical connection with the smart card's contacts, and before the smart card reaches the card stops 44.

FIGS. 4 through 8 will be used to provide a detailed description of the smart card contacts 82 design and operation. FIG. 4 is a cross section of the reader showing the contacts 13, and pivot 14 in a non-active position, the contacts are protruding into the contact apertures 29, but are not protruding into the card receiving area 21. This inactive positioning provides protection of the contacts from foreign objects inserted into the card receiving are causing damage to them. FIG. 5 shows the positions of the contacts 13, PCA holder 11, and pivot 14 when they are in an active state (card fully inserted), but for clarity the card is not shown. The contacts 13 protrude into the card receiving area 21 a distance of 0.3 mm which provides a preload force of between 0.1 to 0.7 newtons as required by EMV, on the contact landing surface 70 and smart card contact pads 62. A landing action is accomplished when the pivot 14 rotates the PCA holder 11 toward the card receiving area 21 as the smart card's leading edge 66 forces the pivot actuating ramp up, which in turn forces the contact landing surface 70 into the card receiving area 21 creating a 0.4 to 0.9 mm sliding action on the smart card's contacts 64 ensuring a reliable electrical connection. Another feature of this compact reader 1 is accomplished by the contact stops 56 (FIG. 5), which prevents the contacts' tips 22 from being exposed in the card receiving area 21, which eliminates the possibility of a card edge, or foreign object from contacting an end surface of the contact which could result in bent contacts. Each contact (reference FIG. 8) has a large landing surface 70 which lowers the force, providing for a longer contact 13 life.

The leading contacts' landing surface 70 is centered 2.5 mm from the front surface of the reader 1. This contact design allows the smart card reader's housings to be as small as possible and still provide a robust smart card reader. In reference to FIG. 7, each contact aperture 29 ensures proper side to side alignment of the contacts with the smart card's contact pads 64.

CONCLUSION, RAMIFICATIONS, AND SCOPE

Accordingly, the reader will see that the compact robust smart card reader described above fills the need for highly reliable, low profile, long lived compact smart card readers with built in PCA and electronics, that can be easily mounted within an enclosure without additional brackets and/or printed circuit boards. Its unique contact design allows for over one million card insertion/withdrawal cycles, and provides an extremely low-profile mechanical package that allows it to be mounted in spaces which heretofore have not been accessible to smart card readers that have built-in electronics and comparable reliability. Its enclosed lever/switch design and debris openings make it more robust and reliable in environments subject to contaminants.

While my above description contains many specifities, these should not be construed as limitations on the scope of the invention, but rather as an exemplification of one preferred embodiment thereof. Many other variations are possible.

For example: 1. The compact robust smart card reader can be mounted within a molded plastic frame that contains a larger bezel and provision for a spring-loaded "gate" that will provide a compact robust smart card reader with a gate that can now be mounted by means of the front (bezel) portion of the plastic frame. 2. Another example is to design a frame and bezel that can be used to retrofit existing reader installations, saving space and adding reliability. 3. The compact robust smart card reader can be packaged in a small enclosure (housing) which can then be used as a peripheral device attached to a terminal, PC, or, similar host equipment.

Accordingly, the scope of the invention should not be determined by the embodiment(s) illustrated, but by the appended claims and their legal equivalents.

The invention claimed is:

1. A compact, robust, Europay/Mastercard/Visa (EMV) certified (#11687 0405 400 20 FIM), landing style contact smart card reader comprising: a top and bottom housing being of minimum size, with a tapered card insertion opening, a card receiving area, a plurality of contacts molded into a robust plastic base, located above said card receiving area with each of said contacts having a leg connected (soldered) to an integral printed circuit board that provides electrical connection to said printed circuit board, which is mounted in a carrier sandwiched between said top and bottom housings, which is engaged by a pivot that is characterized by: features on said pivot, that when contacted by said smart card's leading edge, cause said pivot to move said carrier and said printed circuit board with said contacts through apertures in said bottom housing into said card receiving area, landing on, and making electrical connection with, said smart card's respective contact pads, prior to the leading edge of said smart card activating a card seated switch via a lever, with said smart card then contacting a mechanical stop, completing the insertion of said smart card, wherein the reader's said contacts have a long cantilever spring design that locates the front row of said contacts in close proximity to the front of said card insertion opening, which allows the completed insertion of said smart card to be accomplished in a minimum depth of 21.5 mm, resulting in said top and bottom housings to be of minimum size, thereby enabling the reader to fit within enclosures requiring a small, 21.5 millimeter (mm) insertion depth robust smart card reader that is smaller than existing, stand alone, self contained, landing style contact smart card readers.

2. The compact robust smart card reader, as claimed in claim 1, wherein the reader's said contacts have a long cantilever spring design that provides a constant force perpendicular to the smart card's contact pads resulting in a 0.3 millimeter (mm) to 0.8 mm sliding/wiping action on said smart card's contact pads which ensures removal of loose debris and/or particles to establish and maintain good metal-to-metal electrical connection between said card contact pads and the contact's landing surface, with said sliding/ wiping action measured by inserting a smart card, whose contact pads conform to the minimum size specified by the International Organization for Standardization (ISO) 7816-2, into the compact robust smart card reader for the minimum distance required to electrically verify continuity between the individual contacts of the reader and the individual smart card's contact pads and then, using certified calibrated calipers, measuring the remaining distance that the smart card can be inserted while insuring that electrical continuity is maintained on all contacts throughout insertion for said remaining distance.

3. The compact robust smart card reader, as claimed in claim 1, further comprising: a minimum-height top and bottom housing molded from a high strength, robust plastic material, which is harder than said smart card's plastic such that said bottom housing's card insertion opening and said card receiving area will not have significant wear of the housing's plastic material throughout the compact robust smart card reader's functional life.

4. The compact robust smart card reader, as claimed in claim 1, wherein the top and bottom housing further comprising up to six threaded inserts molded into said top housing's top surface consisting of up to three each on opposite ends of said top surface and further comprising two clearance holes which pass through said top and bottom housings, with each hole positioned in close proximity to the rear most edge of the housings on opposite sides, thus providing a reliable means of securely mounting said compact robust smart card reader to a surface, or enclosure from either said reader's top or bottom surface.

5. The compact robust smart card reader, as claimed in claim 1, wherein the printed circuit board further supports said contacts that are molded into a molded plastic base that supports said contacts that are in the form of a long cantilever spring which allows a low, consistent force on said smart card's contact pads, resulting in minimum wear, and long functional life of said contacts.

6. The compact robust smart card reader, as claimed in claim 1, wherein the printed circuit board further comprising electronics capable of communicating with a memory chip or a computer chip embedded in said smart card, which includes reading from and writing to said smart card chip, as well as communicating to a is host, using standard RS232, or universal serial bus (USB) interfaces for transmitting said signals through flex cables, insulated wires or equivalent conductors, the entirety of which is capable of being used in point of sale terminals, and/or terminals used for financial credit and/or debit card transactions without requiring the terminal manufacturer to design a printed circuit board which in turn would need to become EMV certified.

7. The compact robust smart card reader, as claimed in claim 1, wherein said pivot design has actuating ramp features that are located above debris disposal open areas, with said areas being a significant design feature within the robust plastic housing, which result in their applying a perpendicular force to the two outside edges of said smart card, when said smart card is fully inserted, which causes the card edges to move downward forcing the surface of the smart card containing the contact pads to move upward toward the smart card reader's contacts, which ensures that cards of varying thicknesses will always be subjected to a constant force from the reader's contacts.

8. The compact robust smart card reader, as claimed in claim 7, wherein the pivot design further comprising the mounting of said pivot via two torsion return springs such that the contacts of the compact robust smart card reader remain consistent force, landing style contacts regardless of said reader's mounting orientation.

* * * * *